United States Patent [19]
DiRisio

[11] Patent Number: 6,163,649
[45] Date of Patent: Dec. 19, 2000

[54] RETAINER SUPPORT FOR CLOSING DEVICE WHICH CLOSES LIGHT LOCK IN FILM CARTRIDGE IS MOVABLE TO PERMIT ASSEMBLY/DISASSEMBLY OF CLOSING DEVICE IN ONE-TIME-USE CAMERA

[75] Inventor: Anthony DiRisio, Rochester, N.Y.

[73] Assignee: Eastman Kodak Company, Rochester, N.Y.

[21] Appl. No.: 09/292,249

[22] Filed: Apr. 15, 1999

[51] Int. Cl.[7] .................................................. G03B 17/02
[52] U.S. Cl. ................................................. 396/6; 396/538
[58] Field of Search .............................. 396/538, 6, 513, 396/516

[56] References Cited

U.S. PATENT DOCUMENTS 5,598,239  1/1997  Lawther et al. .
5,629,750  5/1997  Smart et al. .
5,748,989  5/1998  SanGregory et al. .
5,752,118  5/1998  Lai ......................................... 396/538
5,809,359  9/1998  Taku ....................................... 396/538

*Primary Examiner*—David M. Gray
*Attorney, Agent, or Firm*—Roger A. Fields

[57] ABSTRACT

A one-time-use camera comprising a film cartridge with a light lock that is to be moved closed after a filmstrip exposed in the camera is completely wound into the film cartridge, and a closing device movable in engagement with the light lock to move the light lock closed, is characterized in that a retainer support for the closing device is adapted to hold the closing device in the camera and is resilient to permit the retainer support to be deformed temporarily to make room for the closing device to be assembled in the camera and to release the closing device to permit it to be removed from the camera.

9 Claims, 5 Drawing Sheets

RETAINER SUPPORT FOR CLOSING DEVICE WHICH CLOSES LIGHT LOCK IN FILM CARTRIDGE IS MOVABLE TO PERMIT ASSEMBLY/DISASSEMBLY OF CLOSING DEVICE IN ONE-TIME-USE CAMERA

FIELD OF THE INVENTION

The invention relates generally to the field of photography, and in particular to so-called one-time-use or disposable cameras. More specifically, the invention relates to a one-time-use camera in which a closing device is operated to close a light lock in a film cartridge after a filmstrip exposed in the camera is completely wound into the film cartridge. The light lock must be closed to prevent ambient light from entering the film cartridge when the film cartridge is removed from the camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound from the film cartridge onto a film take-up spool in a film supply chamber, a backframe opening between the cartridge receiving and film supply chambers for exposing successive frames of the filmstrip, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a counter wheel rotatable to indicate the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge and moves a fresh frame of the filmstrip from the unexposed film roll to the backframe opening. The rewinding movement of the filmstrip the equivalent of slightly more than one frame width rotates the metering sprocket in engagement with the filmstrip to decrement the counter wheel to its next lower-numbered frame setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Recently the one-time-use camera has been adapted to be used with a film cartridge that has a light lock which is to be pivoted closed after a filmstrip exposed in the camera is completely wound into the film cartridge. The light lock must be pivoted closed to prevent ambient light from entering the film cartridge when the film cartridge is removed from the camera. The camera includes a closing device, such as disclosed in commonly assigned prior art U.S. Pat. No. 5,629,750 issued May 13, 1997, which has a film sensing component that is spring-urged against the filmstrip as the filmstrip is wound into the film cartridge and a closing component in rotational engagement with the light lock. The film sensing component determines that the filmstrip exposed in the camera is completely wound into the film cartridge, and the closing component then closes the light lock.

SUMMARY OF THE INVENTION

According to one aspect of the invention, a one-time-use camera comprising a film cartridge with a light lock that is to be moved closed after a filmstrip exposed in the camera is completely wound into the film cartridge, and a closing device movable in engagement with the light lock to move the light lock closed, is characterized in that:

a retainer support for the closing device holds the closing device in the camera and is resilient to permit the retainer support to be deformed temporarily to release the closing device, whereby the closing device can be removed from the camera.

According to another aspect of the invention, a method of assembling in a one-time-use camera a closing device intended to be moved in engagement with a light lock in a film cartridge to move the light lock closed after a filmstrip exposed in the camera is completely wound into the film cartridge, comprises the steps of:

temporarily bending a resilient retainer support for the closing device to make room for the closing device to be assembled in the camera;

assembling the closing device in the camera; and releasing the retainer support to allow it to straighten and move against the closing device to secure the retainer support in the camera.

DETAILED DESCRIPTION OF THE INVENTION

The invention is disclosed as being embodied preferably in a one-time-use camera. Because the features of a onetime-use camera are generally known, the description which follows is directed in particular only to those elements forming part of or cooperating directly with the disclosed embodiment. It is to be understood, however, that other elements may take various forms known to a person of ordinary skill in the art.

Figure 1:
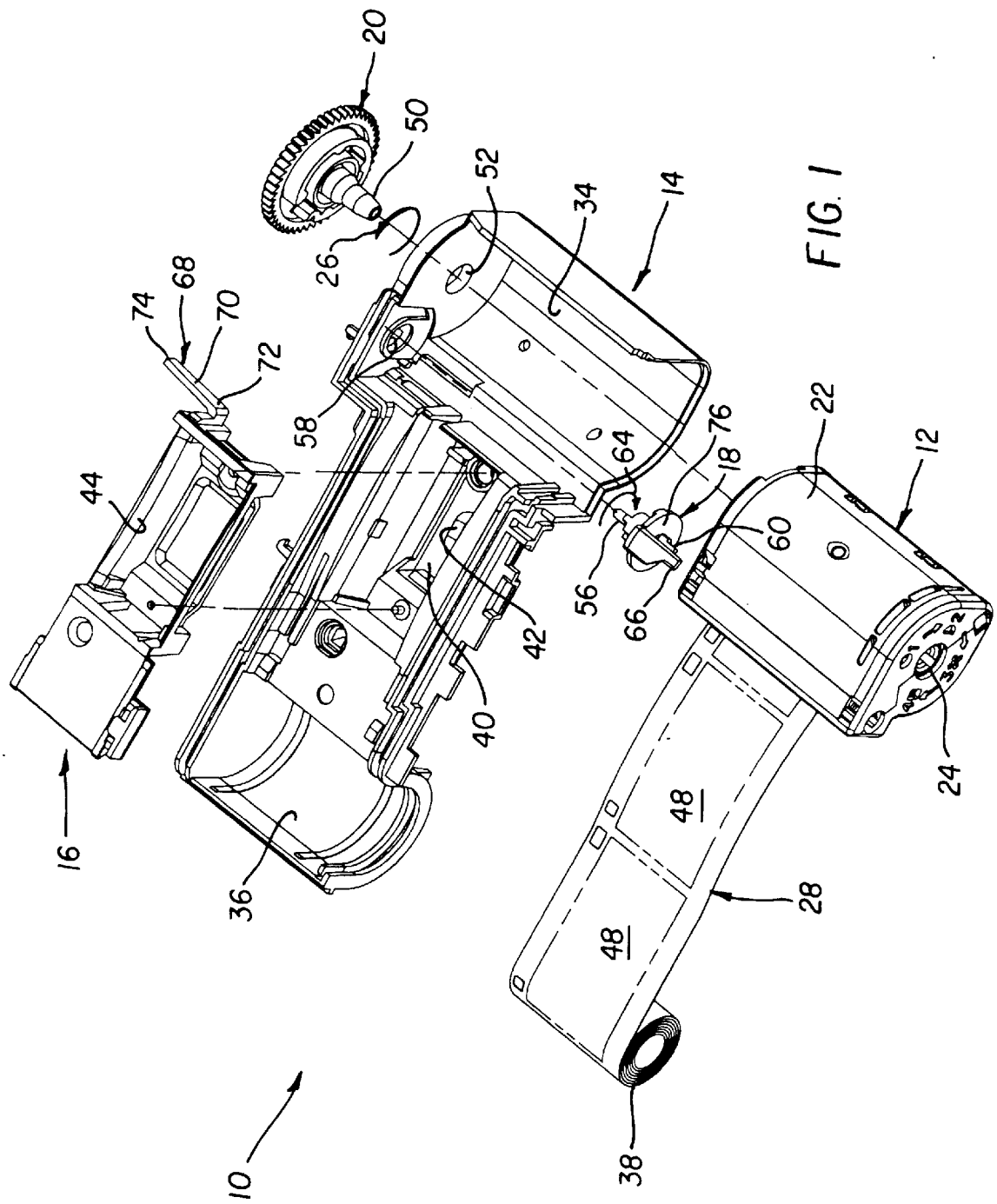
FIG. 1 is an exploded rear perspective view of a partially shown one-time-use camera including a closing device for closing a light lock in a film cartridge and a retainer support for the closing device which permits assembly and disassembly of the closing device in the camera.
Figure 2:
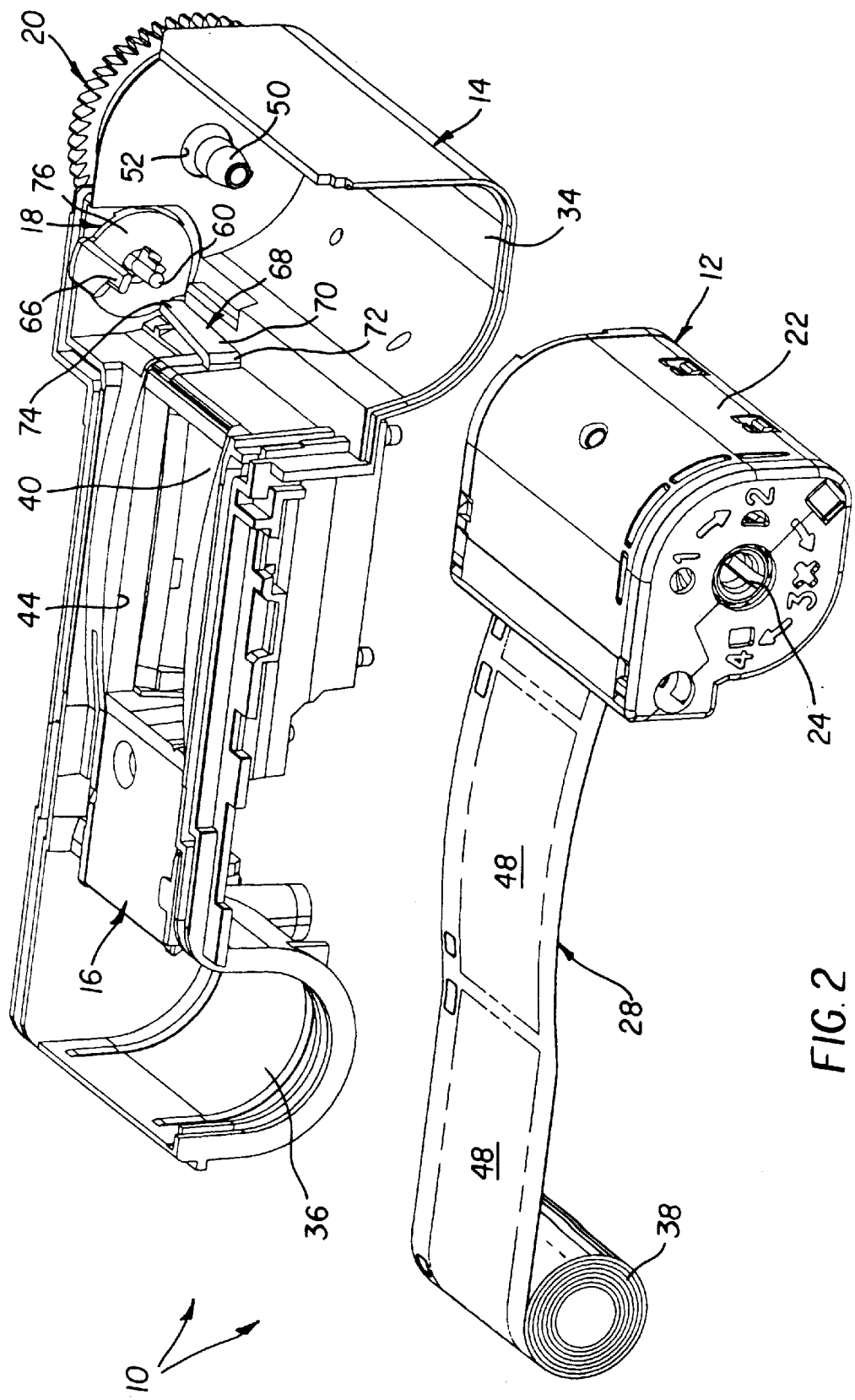
FIG. 2 is a rear perspective view similar to FIG. 1, depicting the closing device assembled in the camera.

Referring now to the drawings, FIGS. 1 and 2 partially show a one-time-use camera 10 comprising a film cartridge 12, a main body part 14, a light baffle insert part 16, a rotatable closing device 18, and a rotatable film winding thumbwheel 20.

Figure 3:
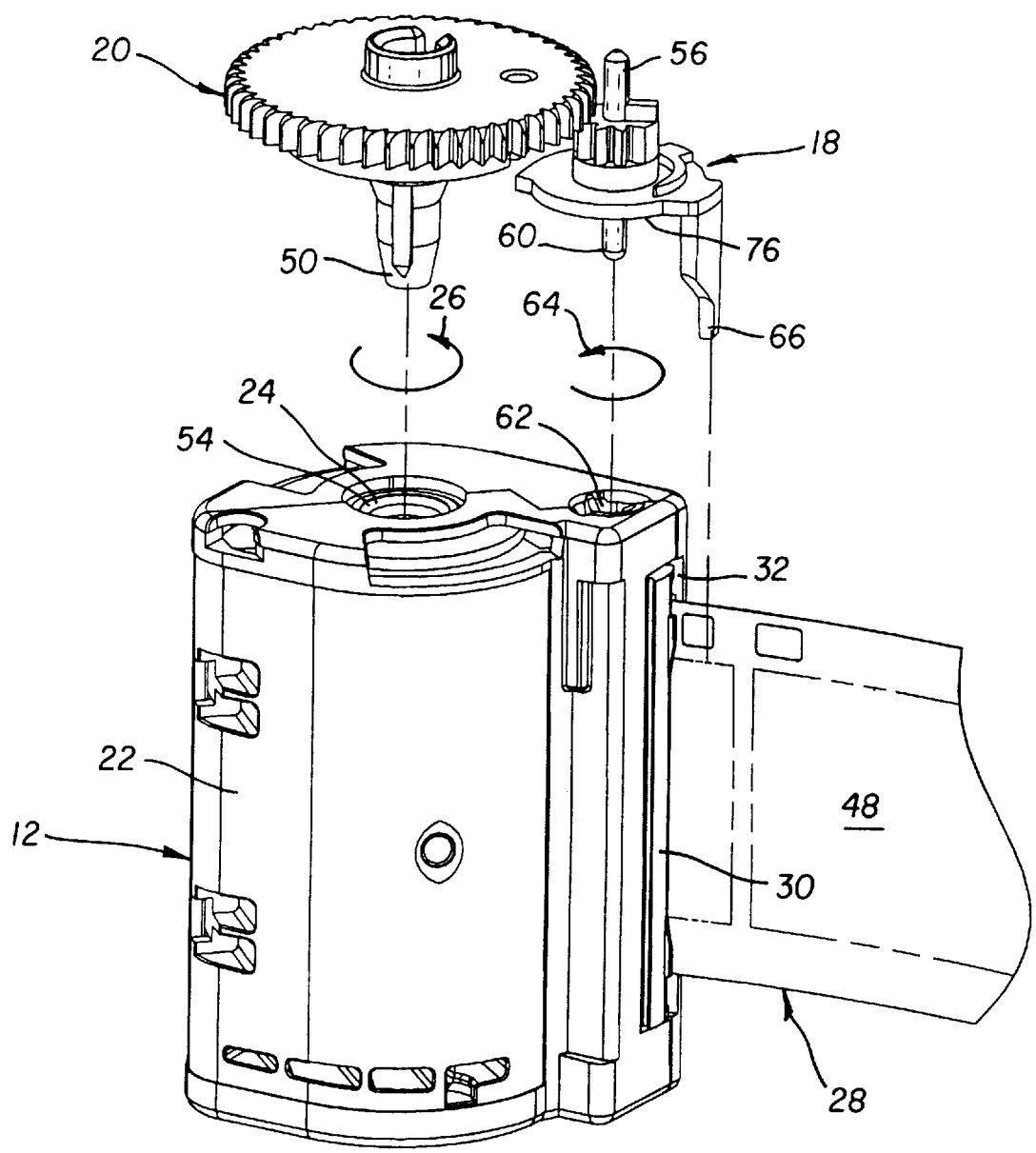
FIG. 3 is a front perspective view of the film cartridge, the closing device and a film winding thumbwheel in the camera.

As shown in FIG. 3, the film cartridge 12 has a cartridge shell 22 that contains a film spool 24 which is rotatable in a film winding direction 26, i.e. counter-clockwise in FIG. 3, to wind a filmstrip 28 exposed in the camera 10 onto the film spool. A light lock 30 inside the cartridge shell 22 is pivotable open within a film egress/ingress opening 32 in the cartridge shell to permit film movement out of and into the cartridge shell. The light lock 30 is pivoted closed after the filmstrip 28 exposed in the camera 10 is completely wound into the cartridge shell 22. The light lock 30 must be closed to prevent ambient light from entering the cartridge shell 22 when the film cartridge 12 is removed from the camera 10.

Figure 4:
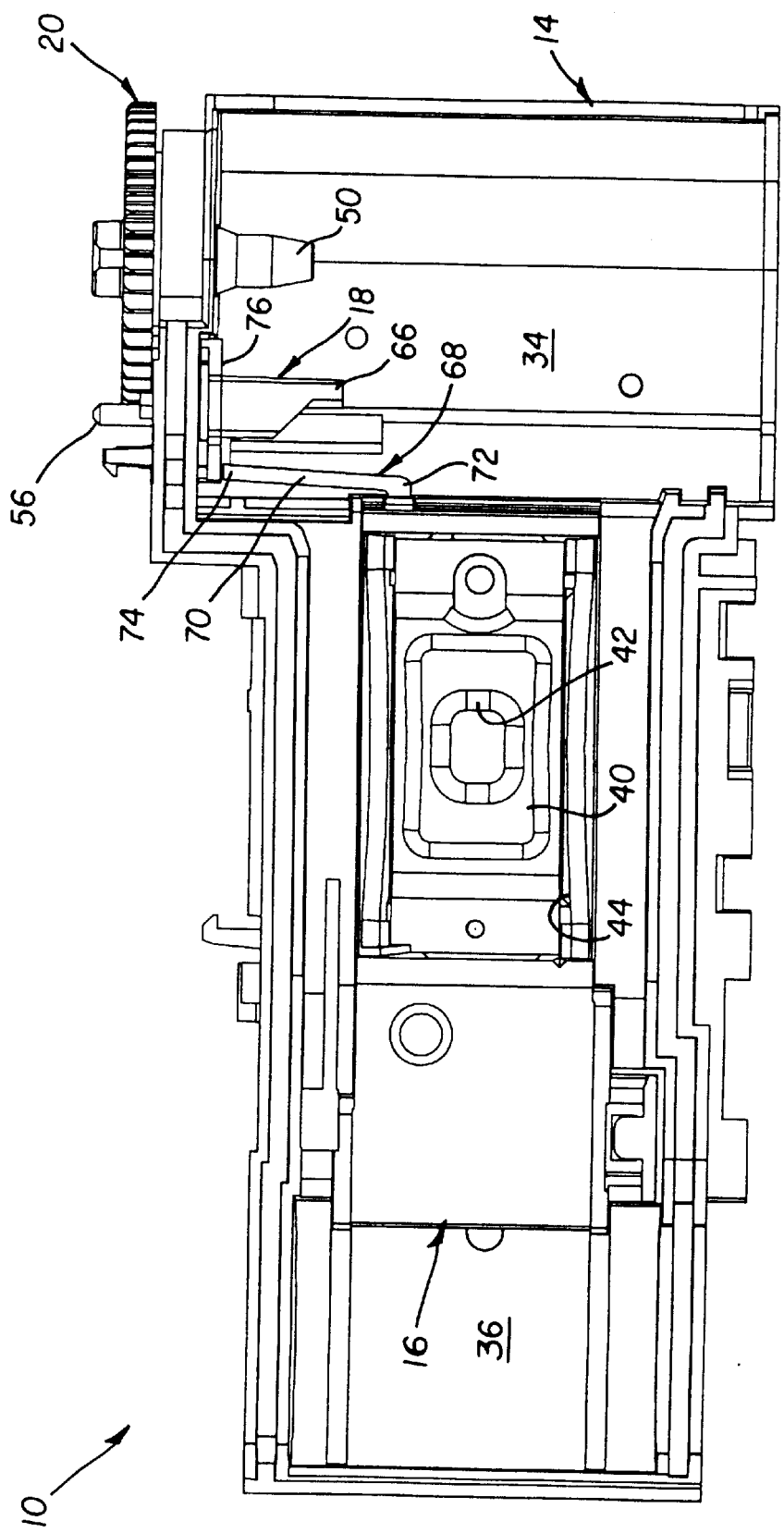
FIG. 4 is a rear elevation view of the camera, depicting the closing device assembled in the camera.

The main body part 14 has a rearwardly-open cartridge receiving or film take-up chamber 34 that contains the film cartridge 22, a rearwardly-open film supply chamber 36 that contains the filmstrip 28 (which is prewound during manufacture of the camera 10 from the film cartridge into an unexposed film roll 38 in the film supply chamber), and a rearwardly-open exposure chamber 40 that is behind a front aperture 42 in the main body part. The light baffle insert part 16 is connected to the main body part 14 as indicated in FIGS. 1, 2 and 4, with a rectangular-shaped backframe opening 44 in the light baffle insert part fitted into the exposure chamber 40. Ambient light passes through the front aperture 42, into the exposure chamber 40, and to the backframe opening 44, in order to expose successive frames 48 of the filmstrip 28 at the backframe opening. A pair of opaque plastic front and rear cover parts (not shown) house the main body part 14 between them.

The film winding thumbwheel 20 has a depending coaxial stem 50 that longitudinally extends through a top bearing hole 52 in the main body part 14 and into rotatable engagement with an exposed end 54 of the film spool 24 inside the cartridge shell 22. See FIGS. 1–3. The film winding thumbwheel 20 is manually rotated in the film winding direction 26, i.e. clockwise in FIGS. 1 and 2 and counter-clockwise in FIG. 3, to wind each frame 48 of the filmstrip 28 that is exposed at the backframe opening 44 into the film cartridge 12 and to advance a fresh frame of the filmstrip from the unexposed film roll 38 to the backframe opening.

The closing device 18 is located in the film take-up chamber 34 except for an upstanding spindle 56 of the closing device which longitudinally extends into a top bearing hole 58 in the main body part 14. A depending coaxial stem 60 of the closing device 18 is in rotatable engagement with an exposed end 62 of the light lock 30 in the cartridge shell 22. See FIGS. 1–3. The closing device 18 is spring-urged (spring not shown) to rotate in a closing direction 64, i.e. clockwise in FIGS. 1 and 2 and counter-clockwise in FIG. 3, to bias a film sensor 66 of the closing device against successive edge portions of the filmstrip 28, nearby the film egress/ingress opening 32 in the cartridge shell 22, and to pivot the light lock 38 closed when the filmstrip is completely wound into the cartridge shell.

A retainer support 68 for the closing device 18 is located in the film take-up chamber 34, and it includes a resilient cantilever beam 70 that has one end 72 fixed to (integral with) the light baffle insert part 16 and an opposite free end 74 against an underside 76 of the closing device to hold the closing device 18 in the film take-up chamber with the spindle 56 in the top bearing hole 58. See FIGS. 2 and 4. The cantilevered beam 70 can be bent or deformed, counter-clockwise about its fixed end 72 in FIG. 5, to swing its free end 74 out from against the underside 76 of the closing device 18. This allows the spindle 56 to drop out of the top bearing hole 58, to disassemble the closing device 18 from the main body part 14. The cantilevered beam 70, when released from being bent, springs back to straighten.

Figure 5:
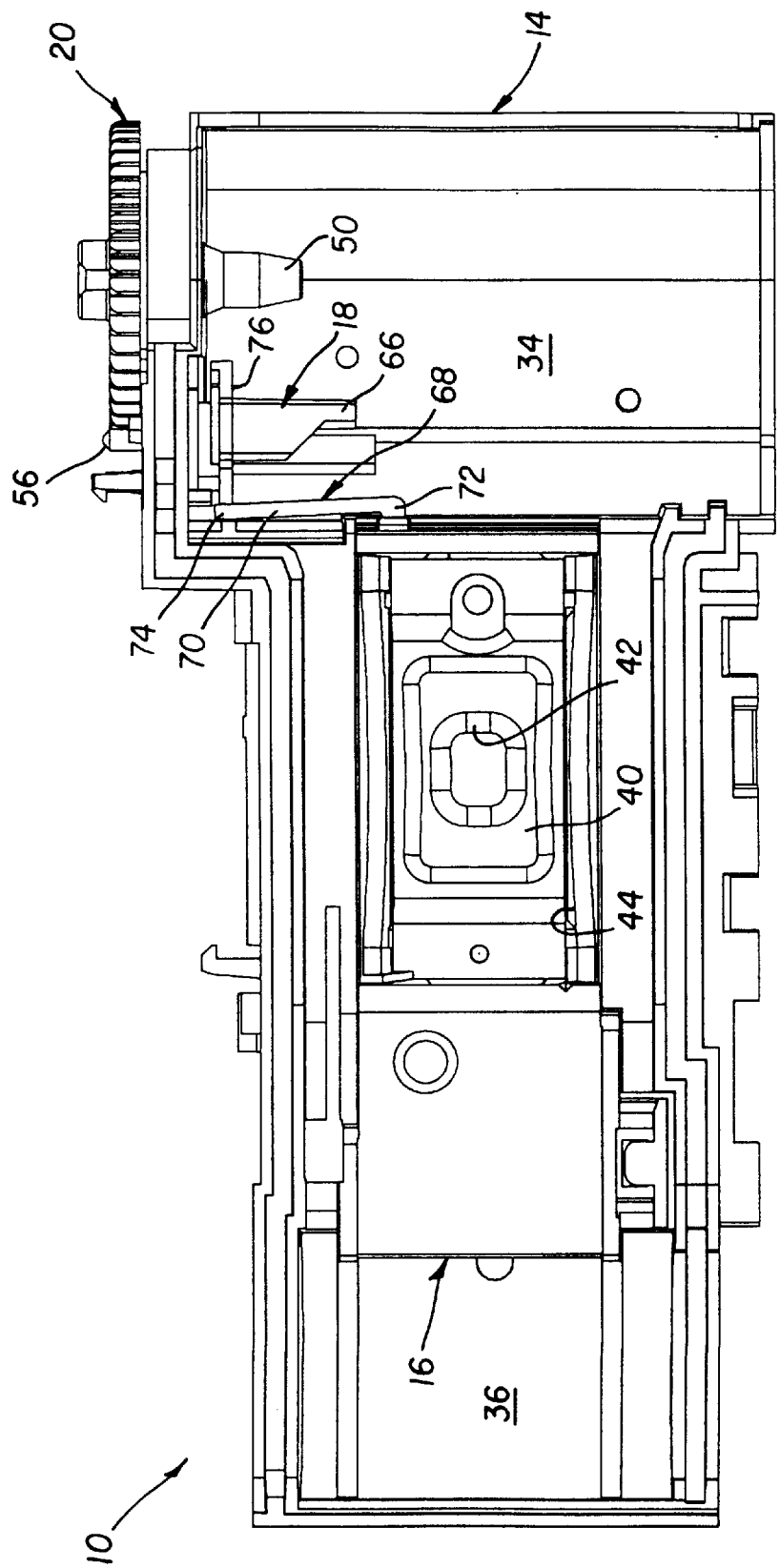
FIG. 5 is a rear elevation view of the camera, depicting the closing device being disassembled from the camera.

A method of disassembling the closing device 18 from the main body part 14 comprises the steps of:

temporarily bending the cantilevered beam 70 of the resilient retainer support 68 about its fixed end 72 to swing its free end 74 out of the way of the underside 76 of the closing device 18 as shown in FIG. 5, to permit the spindle 56 of the closing device to be removed from the top bearing hole 58 in the main body part 14;

removing the spindle 56 from the top bearing hole 58; and releasing the cantilevered beam 70 to allow it to straighten.

A method of assembling the closing device 18 in the main body part 14 comprises the steps of:

temporarily bending the cantilevered beam 70 of the resilient retainer support 68 counter-clockwise about its fixed end 72 in FIG. 5 to swing its free end 74, to make room for the closing device 18 to be moved to insert the spindle 56 of the closing device into the top bearing hole 58 in the main body part 14;

inserting the spindle 56 into the top bearing hole 58, to allow rotation of the closing device 18 with its depending stem 60 in engagement with the exposed end 62 of the light lock 30 in the cartridge shell 22 to move the light lock closed; and releasing the cantilevered beam 70 to allow it to straighten and move against the underside 76 of the closing device 18 to hold the closing device to maintain the spindle 56 in the top bearing hole 56.

The invention has been described with reference to a preferred embodiment. However, it will be appreciated that variations and modifications can be effected by a person of ordinary skill in the art without departing from the scope of the invention.

PARTS LIST 10. one-time-use camera
12. film cartridge
14. main body part
16. light baffle insert part
18. closing device
20. film winding thumbwheel
22. cartridge shell
24. film spool
26. film winding direction
28. filmstrip
30. light lock
32. film egress/ingress opening
34. film take-up chamber
36. film supply chamber
38. unexposed film roll
40. exposure chamber
42. front aperture
44. backframe opening
48. film frames 50. depending coaxial stem
52. top bearing hole
54. exposed end
56. spindle
58. top bearing hole
60. depending coaxial stem
62. exposed end
64. closing direction
66. film sensor
68. retainer support
70. cantilevered beam
72. fixed end
74. free end
76. underside

What is claimed is:

1. A one-time-use camera comprising a film cartridge with a light lock that is to be moved closed after a filmstrip exposed in said camera is completely wound into said film cartridge, a main body part that has a chamber for said film cartridge, and a closing device movable within said chamber in engagement with said light lock to move said light lock closed, is characterized in that:

a retainer support for said closing device projects within said chamber to against said closing device to hold said closing device in said camera and is resilient to permit said retainer support to be deformed temporarily to release said closing device, whereby said closing device can be removed from said camera.

2. A one-time-use camera as recited in claim 1, wherein said main body part has a bearing hole, said closing device has a spindle that is located in said bearing hole to allow rotation of said closing device in engagement with said light lock to move said light lock closed, and said retainer support projects within said chamber from said main body part to against said closing device to maintain said spindle in said bearing hole and can be bent to separate from said closing device to permit said spindle to be removed from said bearing hole.

3. A one-time-use camera as recited in claim 2, wherein said retainer support includes a resilient cantilevered beam having one end that is fixed in said chamber and an opposite free end in said chamber that is against an underside of said closing device.

4. A one-time-use camera as recited in claim 2, wherein said bearing hole is open at said chamber, and said closing device is located in said chamber except for said spindle which extends into said bearing hole.

5. A method of assembling in a one-time-use camera a closing device intended to be moved in engagement with a light lock in a film cartridge in a chamber to move the light lock closed after a filmstrip exposed in the camera is completely wound into the film cartridge in the chamber, said method comprising the steps of:

temporarily bending in the chamber a resilient retainer support for the closing device to make room in the chamber for the closing device to be assembled in the chamber;

assembling the closing device in the chamber; and releasing the retainer support to allow it to straighten in the chamber and move in the chamber against the closing device to secure the retainer support in the chamber.

6. A method of assembling in a one-time-use camera a closing device intended to be moved in engagement with a light lock in a film cartridge in a chamber to move the light lock closed after a filmstrip exposed in the camera is completely wound into the film cartridge in the chamber, said method comprising the steps of:

temporarily bending in the chamber a resilient retainer support for the closing device, on a main body part of the camera, to make room in the chamber for the closing device to be moved to insert a spindle of the closing device into a bearing hole in the main body part;

inserting the spindle into the bearing hole to allow rotation of the closing device in engagement with the light lock to move the light lock closed; and releasing the retainer support to allow it to straighten in the chamber and move in the chamber against the closing device to hold the closing device to maintain the spindle in the bearing hole.

7. A method of disassembling in a one-time-use camera a closing device supported to be moved in engagement with a light lock in a film cartridge in a chamber to move the light lock closed after a filmstrip exposed in the camera is completely wound into the film cartridge in the chamber, said method comprising the steps of:

bending a resilient retainer support for the closing device out of the way of the closing device, in the chamber, to permit the closing device to be disassembled from the chamber;

disassembling the closing device from the chamber; and releasing the retainer support to allow it to straighten in the chamber.

8. A method of disassembling in a one-time-use camera a closing device supported to be rotated in engagement with a light lock in a film cartridge in a chamber to pivot the light lock closed after a filmstrip exposed in the camera is completely wound into the film cartridge, said method comprising the steps of:

bending in the chamber a resilient retainer support for the closing device, on a main body part of the camera, out of the way of the closing device to permit a spindle of the closing device to be removed from a bearing hole in the main body part;

removing the spindle from the bearing hole; and releasing the retainer support to allow it to straighten in the chamber.

9. A one-time-use camera comprising a film cartridge with a light lock that is to be moved closed after a filmstrip exposed in said camera is completely wound into said film cartridge, a main body part that has a chamber for said film cartridge and a bearing hole open at said chamber, and a closing device that extends into said chamber and has a spindle located in said bearing hole to allow rotation of said closing device in engagement with said light lock to move said light lock closed, is characterized in that:

a retainer support for said closing device projects within said chamber from said main body part to against said closing device to maintain said spindle in said bearing hole and hold said closing device in said camera, and is resilient to permit said retainer support to be bent temporarily to separate from said closing device in order to permit said spindle to be removed from said bearing hole, whereby said closing device can be removed from said camera.

* * * * *